(12) United States Patent
Yoshizaki et al.

(10) Patent No.: US 11,551,839 B2
(45) Date of Patent: Jan. 10, 2023

(54) MOTOR

(71) Applicant: JFE Steel Corporation, Tokyo (JP)

(72) Inventors: Souichiro Yoshizaki, Tokyo (JP); Yoshiaki Zaizen, Tokyo (JP); Kunihiro Senda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 128 days.

(21) Appl. No.: 17/054,605

(22) PCT Filed: Mar. 20, 2019

(86) PCT No.: PCT/JP2019/011635
§ 371 (c)(1),
(2) Date: Nov. 11, 2020

(87) PCT Pub. No.: WO2019/220770
PCT Pub. Date: Nov. 21, 2019

(65) Prior Publication Data
US 2021/0125759 A1   Apr. 29, 2021

(30) Foreign Application Priority Data

May 14, 2018 (JP) .............................. JP2018-092718

(51) Int. Cl.
H01F 1/147   (2006.01)
C21D 6/00    (2006.01)
(Continued)

(52) U.S. Cl.
CPC .............. H01F 1/147 (2013.01); C21D 6/008 (2013.01); C21D 8/1222 (2013.01);
(Continued)

(58) Field of Classification Search
None
See application file for complete search history.

(56) References Cited

U.S. PATENT DOCUMENTS 5,714,017 A      2/1998  Tomida et al.
2014/0216606 A1  8/2014  Heo
(Continued)

FOREIGN PATENT DOCUMENTS

CN  109563583 A   4/2019
EP    3165624 A1  5/2017
(Continued)

OTHER PUBLICATIONS

Extended European Search Report for European Application No. 19 804 557.7, dated Jan. 4, 2022, 8 pages.
(Continued)

Primary Examiner — Seth Dumbris
Assistant Examiner — Kim S. Horger
(74) Attorney, Agent, or Firm — RatnerPrestia

(57) ABSTRACT

A motor comprising a steel sheet used as a core material of the motor, wherein the steel sheet includes a composition including: by mass %, 0.010% or less of C; 2.0% to 7.0% of Si; 2.0% or less of Al; 0.05% to 1.0% of Mn; 0.005% or less of S; 0.005% or less of N; and balance Fe and inevitable impurities; the steel sheet includes a magnetic flux density changing area where a change ΔB in magnetic flux density to a change ΔH=50 A/m in a magnetic field, is equal to or higher than 0.50 T; a thickness of the steel sheet is 0.05 mm to 0.20 mm; and an eddy-current loss of the steel sheet, at 1000 Hz–1.0 T, is equal to or less than 0.55 of a total iron loss.

4 Claims, 2 Drawing Sheets

(51) Int. Cl.
    *C21D 8/12*    (2006.01)
    *C21D 9/46*    (2006.01)
    *C22C 38/00*   (2006.01)
    *C22C 38/02*   (2006.01)
    *C22C 38/04*   (2006.01)
    *C22C 38/06*   (2006.01)
    *H02K 1/02*    (2006.01)

(52) U.S. Cl.
    CPC ......... *C21D 8/1233* (2013.01); *C21D 8/1266* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *H02K 1/02* (2013.01)

(56) References Cited

U.S. PATENT DOCUMENTS

| | | | |
|---|---|---|---|
| 2016/0351308 A1* | 12/2016 | Oda | C22C 38/00 |
| 2019/0112697 A1 | 4/2019 | Hiratani et al. | |
| 2019/0228891 A1 | 7/2019 | Natori et al. | |
| 2019/0244735 A1 | 8/2019 | Oda et al. | |

FOREIGN PATENT DOCUMENTS

| | | | |
|---|---|---|---|
| EP | 3438314 A1 | 2/2019 | |
| JP | 0920966 A | 1/1997 | |
| JP | 11199988 A | 7/1999 | |
| JP | 2001025181 A | 1/2001 | |
| JP | 2003113452 A | 4/2003 | |
| JP | 4677955 B2 | 4/2011 | |
| JP | 2012251191 A | 12/2012 | |
| JP | 2013034348 A | 2/2013 | |
| KR | 101227767 B1 | 1/2013 | |
| TW | 201816143 A | 5/2018 | |
| TW | 201912810 A | 4/2019 | |
| WO | 2017138181 A1 | 8/2017 | |
| WO | 2017170749 A1 | 10/2017 | |
| WO | WO-2018025941 A1 * | 2/2018 | ............... C21D 1/74 |

OTHER PUBLICATIONS

Taiwan Notice of Reasons for Refusal with Search Report for Taiwan Application No. 108114587, dated Dec. 25, 2019, 6 pages.
International Search Report and Written Opinion for International Application No. PCT/JP2019/011635, dated May 28, 2019, 4 pages.
Taiwan Notice of Reasons for Refusal with Search Report for Taiwan Application No. 108114587, dated Dec. 24, 2019, 6 pages.
Chinese Office Action for Application No. 201980032398.8, dated Jun. 17, 2021 with English Search Report, 8 pages.
Korean Office Action for Korean Application No. 10-2020-7032541, dated Jun. 24, 2022, 6 pages.

* cited by examiner

MOTOR

CROSS REFERENCE TO RELATED APPLICATIONS

This is the U.S. National Phase application of PCT/JP2019/011635 filed Mar. 20, 2019, which claims priority to Japanese Patent Application No. 2018-092718, filed May 14, 2018, the disclosures of these applications being incorporated herein by reference in their entireties for all purposes.

FIELD OF THE INVENTION

The present invention relates to a motor that is suitable for cordless home appliances, cutting tools, and drones, and is driven at high speed.

BACKGROUND OF THE INVENTION

Product value of apparatuses using a battery as a power supply, such as cordless home appliances (for example, a vacuum cleaner), cutting tools, and drones, frequently depend on their usable time and weight. It is therefore highly demanded to increase the efficiency by reducing loss in the control system such as a motor and an inverter, and to achieve downsizing and higher speed rotation of the motor. Motors are thus designed to have the minimum body size and to be able to output the maximum power at the highest efficiency depending on the usage. On the other hand, motors are required to be driven not only at a rotational speed for the maximum output (maximum output speed), but also under conditions of a lower output speed and a lower output. Under such driving conditions, the iron core is excited by the magnet to a level that is not necessarily required, which compromises the efficiency of the motor. Against this background, to reduce the iron loss in the motor when driving under conditions other than the maximum output, in some driving conditions, control is conducted on the motor to intentionally weaken the excitation magnetic flux density of the iron core by current phase advance control. This type of motor is designed to be smaller and lighter and thus to rotate at high speed. The excitation frequency of the iron core is therefore high such as one to several kilo-Hertz. Iron cores for specific purposes are made of permendur and other materials. Since such materials are quite expensive, non-oriented electrical steel sheets are widely used for iron cores.

The loss caused in the iron core is classed into the hysteresis loss and the eddy-current loss. As is known, the eddy current loss becomes dominant with an increase in the excitation frequency. As measures taken to reduce the eddy-current losses, for example, the specific resistance of the steel sheet may be increased by adding a non-magnetic element such as Si or Al, or the thickness of the sheet may be reduced. Unfortunately, increasing the content of alloy made of non-magnetic elements reduces the value of magnetic saturation of the steel sheet. To reduce the iron loss at high frequencies while keeping the magnetic flux density high, Patent Literature 1 describes use of Si gradient steel that has the concentration gradient of Si controlled in the sheet thickness direction.

PATENT LITERATURE

Patent Literature 1: Japanese Patent No. 4677955

SUMMARY OF THE INVENTION

Use of the Si gradient steel for a material of the iron core of an electric apparatus, having an excitation frequency of several kilo-Hertz, can reduce the eddy-current losses; however, this method is not sufficiently effective to reduce the loss in a motor in which the above-described current phase advance control is employed with the intention to reduce the loss in the motor iron core. This is a critical issue especially for a reduced-size high-speed motor that is designed to be fed with power from the battery. For controlling the magnetic flux density of the iron core using the current phase advance control, a large magnetizing force is necessary. In other words, it is necessary to apply a large current to the magnet wire or to increase the number of windings of the coil. An increase in the current increases the copper loss, the loss in the magnet wire, which reduces the efficiency of the motor. An increase in the number of windings of the coil increases the counter electromotive voltage generated by a rotor magnet of the motor, which makes it more difficult to drive the motor at high rotational speed. As described above, a motor that achieves high efficiency, downsizing, and high speed under limited power conditions has problems to be solved, and above all, an iron core material suitable for such a motor is yet to be found.

Aspects of the present invention are made in view of the above problems. An object according to aspects of the present invention is to provide a motor capable of achieving higher efficiency, downsizing, and higher speed by reducing the iron loss during drive at a rotational speed lower than the maximum rotational speed.

To solve the above problems, the inventors of the present invention have conducted earnest studies on iron core materials having electrical characteristics suitable for high-speed motor. As a result, it has been found out that iron core materials having not only a low iron loss but also having a sharp change in a magnetic flux density to a change in a magnetic field is effective for achieving higher efficiency, downsizing, and higher speed of a motor. In the present specification, "high-speed motor" means a motor whose maximum frequency of basic component of excitation condition of iron core, is over 1000 Hz.

To solve the problem and achieve the object, a motor according to aspects of the present invention that is able to perform motor drive control that weakens a magnetic flux density of an iron core during drive at a rotational speed lower than a maximum rotational speed. The motor includes a steel sheet used as a core material of the motor, wherein the steel sheet includes a composition including: by mass %, 0.010% or less of C; 2.0% to 7.0% of Si; 2.0% or less of Al; 0.05% to 1.0% of Mn; 0.005% or less of S; 0.005% or less of N; and balance Fe and inevitable impurities; the steel sheet includes a magnetic flux density changing area where a change $\Delta B$ in magnetic flux density to a change $\Delta H=50$ A/m in a magnetic field, is equal to or higher than 0.50 T; a thickness of the steel sheet is 0.05 mm to 0.20 mm; and an eddy-current loss of the steel sheet, at 1000 Hz–1.0 T, is equal to or less than 0.55 of a total iron loss.

Moreover, in the motor according to aspects of the present invention, the steel sheet further includes: by mass %, at least one element selected from 0.01% to 0.1% of P; 0.001% to 0.1% of Sn; 0.001% to 0.1% of Sb; and 0.001% to 0.01% of Mo.

Moreover, in the motor according to aspects of the present invention, a difference between a concentration of Si at a surface of the steel sheet and a concentration of Si at a center portion of the steel sheet is 0.5% to 4.0%, and a saturation magnetic flux density Bs of the steel sheet is equal to or higher than 2.0 T.

Moreover, in the motor according to aspects of the present invention, the magnetic flux density changing area is present in an area including a magnetic flux density equal to or higher than 1 T.

According to aspects of the present invention, it is possible to provide a motor capable of achieving higher efficiency, downsizing, and higher speed by reducing the iron loss during drive at a rotational speed lower than the maximum rotational speed.

DETAILED DESCRIPTION OF EMBODIMENTS OF THE INVENTION

Figure 1:
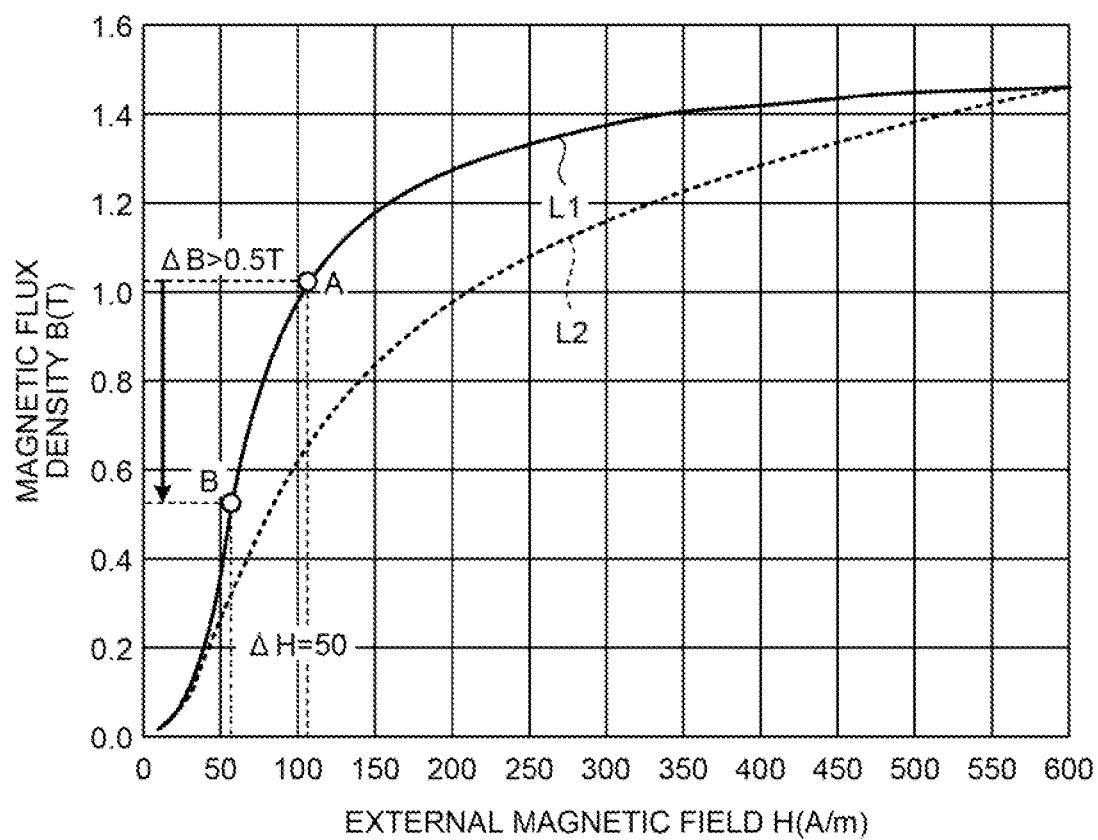
FIG. 1 is an example graph of the magnetic flux density versus the external magnetic field of a steel sheet.

Requirements of a steel sheet, used as a material of the iron core of a motor according to aspects of the present invention, and reasons for the limitation will now be described. There is no limitation, other than being a magnetic motor, on the type of motor according to aspects of the present invention. In the following description, added components simply indicated in "percentage" are actually in "percentage by mass".

C: Equal to or smaller than 0.010%

Since excessively adding carbon (C) to a steel sheet increases the hysteresis losses in the motor, the content of C should be equal to or less than 0.010%.

Si: from 2.0% to 7.0%

Silicon (Si) is an additive element effective for reducing the eddy-current losses in the motor by increasing the specific resistance of the steel sheet. Too much Si added to a steel sheet, however, makes the processing into a motor iron core more difficult and reduces the saturation magnetic flux density of the steel sheet. The content of Si should therefore be from 2.0% to 7.0%. Since adding Si equal to or higher than 4.0% impairs the rollability of the steel sheet, for example, Si may be added after cold rolling using the chemical vapor siliconizing method. More specifically, Si may be added such that the concentration difference of Si between the center layer and the surface layer of the steel sheet is in the range from 0.5% to 4.0% and that the saturation magnetic flux density Bs is equal to or higher than 2.0 T. This manner is advantageous in reducing the size of the motor while reducing the eddy-current losses.

Al: equal to or less than 2.0%, Mn: from 0.05% to 1.0%

Aluminum (Al) and manganese (Mn) are elements effective for reducing the eddy-current losses in a motor by increasing the specific resistance of the steel sheet. Excessive addition of Al and Mn, however, negatively affects the grain growth and increases the hysteresis losses in the motor. The content of Al should therefore be equal to or less than 2.0%, and the content of Mn should be in the range from 0.05% to 1.0%.

S: equal to or less than 0.005%, N: equal to or less than 0.005%, the balance being Fe and unavoidable impurities Excessive addition of S and N causes generation of precipitates and inhibits the grain growth and increases the hysteresis losses in the motor. The content of each S and N is therefore equal to or less than 0.005%, and the balance is Fe and unavoidable impurities.

At least one of elements selected from P: from 0.01% to 0.1%, Sn: from 0.001% to 0.1%, Sb: from 0.001% to 0.1%, and Mo: from 0.001% to 0.01%

To the above composition, containing at least one of elements selected from P: from 0.01% to 0.1%, Sn: from 0.001% to 0.1%, Sb: from 0.001% to 0.1%, and Mo: from 0.001% to 0.01% can improve the magnetic flux density of the steel sheet. It is therefore preferable to add the selected element. However, excessive addition of whatever the element impairs productivity and magnetic characteristics of the steel sheet.

Change $\Delta B$ in magnetic flux density to change $\Delta H=50$ A/m in magnetic field being equal to or higher than 0.50 T A steel sheet subjected to a sharp change $\Delta B$ in the magnetic flux density equal to or higher than 0.50 T to a change $\Delta H=50$ A/m in the magnetic field enables easy control of the magnetic flux density of the motor in the event of drive that is powered by a battery and has limited conditions on the power supply (the voltage, the current, or both of them).

For example, FIG. 1 is an example graph of the magnetic flux density B versus the external magnetic field H of a steel sheet. In an example according to aspects of the invention (a curve L1), a change $\Delta B$ in the magnetic flux density B is equal to or higher than 0.50 T to a change $\Delta H=50$ A/m in the external magnetic field H from a point A to a point B. In a comparative example (a curve L2), there is no areas that includes a change $\Delta B$ in the magnetic flux density B equal to or higher than 0.50 T to a change $\Delta H=50$ A/m in the external magnetic field H. In the example according to aspects of the invention, for example, if the excitation magnetic flux density in use of a magnet is designed to a value around the point A, a magnetizing force of 50 A/m is necessary for a current control to weaken the magnetic flux density of the iron core to the level of the point B. In the comparative example, a magnetizing force of 140 A/m is necessary to weaken the magnetic flux density of the iron core from the level of the point A to the level of the point B. With power supply under limited conditions, however, such a strong magnetizing force is actually unavailable. It is therefore difficult to weaken the magnetic flux density, and the current control cannot effectively reduce the iron loss in the motor.

The steel sheet used as a material of the iron core of a motor according to aspects of the present invention therefore has an area having a sharp change in the magnetic flux density where a change $\Delta B$ in magnetic flux density is equal to or higher than 0.50 T to a change $\Delta H=50$ A/m in the magnetic field. Furthermore, if this area having a sharp change in the magnetic flux density is present in the area including the magnetic flux density equal to or higher than 1 T, the magnetic flux density of the iron core is maintained high with the above-described current control being effectively conducted. Downsizing of the motor is therefore achieved.

Thickness of sheet: from 0.05 mm to 0.20 mm

Although reducing the thickness of a steel sheet is effective in reducing the eddy-current losses in the motor, making the steel sheet thinner problematically increases the manufacturing cost and the cost for producing the motor iron core. The thickness of the steel sheet should therefore be in the range from 0.05 mm to 0.20 mm Eddy-current loss at 1000 Hz–1.0 T being equal to or less than 0.55 of total iron loss The excitation frequency of a small high-speed motor is usually several hundreds to 10 kHz. When the motor actually drives, the iron loss at high frequencies caused with excitation from a PWM inverter is a more important issue. Since the eddy-current loss is dominant at high frequencies, if the eddy-current loss at 1000 Hz–1.0 T is not smaller than the hysteresis loss, the loss generated in the iron core is large. The loss reduces the efficiency of the motor, and moreover, an increase in the size of the motor is inevitable to avoid heat generation. The eddy-current loss at 1000 Hz–1.0 T should therefore be equal to or less than 0.55 of the total iron loss. The eddy-current loss herein defined is calculated using, what is called, the dual-frequency method, on the magnetic characteristics measured using a method in compliance with JIS C 2550-1. If the motor iron core is magnetically closed, the magnetic characteristics may be measured as a ring iron core with primary and secondary coils wound. In this case, any of the magnetic characteristics may meet the above standards.

A steel sheet used as a material of the iron core of the motor according to aspects of the present invention may be any desired steel sheet satisfying the above requirements. Such a steel sheet is preferably manufactured in the following conditions.

There is no limitation on the conditions of hot rolling applied to steel slabs, and any desired known conditions may be used. It is preferable that the temperature to heat the slabs be under 1250° C. for energy efficiency and that the thickness of a finished hot-rolled steel sheet be equal to or smaller than 2.0 mm. If the sheet finally has a thickness of 0.05 mm to 0.20 mm after undergoing a high rate of reduction in cold rolling, crystal planes, which inhibit magnetization (111), are increased in the crystal texture after recrystallization. The thickness is, however, not necessarily in the range if the cold rolling is performed twice with intermediate annealing put therebetween. After hot rolling, and annealing treatment if necessary, the steel sheet undergoes cold rolling to have a thickness of 0.05 mm to 0.20 mm. The sheet then undergoes finishing annealing that heats and retains the sheet at temperatures in the range from 900° C. to 1250° C. in an oxidation atmosphere equal to or less than 0.010, given by $P(H_2O)/P(H_2)$. The heating rate is set equal to or higher than 25° C./s in the temperature range from 600° C. to 900° C., which is beneficial in improving the crystal texture and obtaining excellent magnetic characteristics. The heating rate is preferably equal to or higher than 100° C./s, and is more preferably, equal to or higher than 200° C./s. Furthermore, in the finishing annealing process, the Si concentration distribution of the steel is controlled at temperatures higher than 1200° C. using the chemical vapor siliconizing method. With this control, more excellent magnetic characteristics are obtained. The steel sheet used for the iron core of the motor according to aspects of the present invention is manufactured in the above manufacturing conditions to be adjusted as appropriate. The motor iron core is made by punching, wire cutting, and other methods. The advantageous effects according to aspects of the present invention are exerted by any method satisfying the requirements. As is known, introducing strain into the core material by punching affects the magnetic characteristics of the core material. It is therefore preferable to perform stress relieving annealing if punching is employed.

EXAMPLE

The steel slabs (steel marks A to F) containing the components of Table 1 were heated to 1200° C. and then formed into hot-rolled steel sheets having a thickness of 1.8 mm through the hot rolling process. The sheet underwent annealing treatment at 1000° C.×30 s and was finished as a sheet having a thickness of 0.05 mm to 0.20 mm through the cold-rolling process. Finishing annealing was performed under the conditions (test numbers 1 to 13) of Table 2. Magnetic characteristics (the maximum change $\Delta B(T)$ in the magnetic flux density to $\Delta H=50$ A/m, and the rate of eddy-current loss at $W_{10/1000}$) indicated in Table 2 were obtained.

The magnetic characteristics were measured using a method in accordance with JIS C 2550-1. Some cold-rolled steel sheets having passed the cold-rolling process were subjected to siliconizing treatment in the finishing annealing process, at 1200° C. under the atmosphere of silicon tetrachloride using the chemical vapor siliconizing method. The time period of treatment and the magnetic characteristics are indicated in Table 3. With regards to the sheets subjected to the siliconizing treatment, since the siliconizing treatment changes the concentration of Si and C, values of these components after the treatment were added to the data. Components of the steel slab and components of the steel sheet used for the iron core were the same in other conditions.

TABLE 1

| Steel Mark | Components (mass %) | | | | | | |
|---|---|---|---|---|---|---|---|
| | C | Si | Al | Mn | S | N | Others |
| A | 0.002 | 2.5 | 0.002 | 0.1 | 0.002 | 0.001 | Sn: 0.04 |
| B | 0.003 | 3.6 | 0.1 | 0.6 | 0.003 | 0.002 | — |
| C | 0.0015 | 3.1 | 1 | 0.2 | 0.001 | 0.001 | P: 0.07 |
| D | 0.002 | 4 | 0.2 | 0.8 | 0.002 | 0.002 | Mo: 0.05 |
| E | 0.01 | 3.3 | 0.2 | 0.1 | 0.001 | 0.002 | Sb: 0.005 Sn: 0.007 |
| F | 0.0025 | 2.7 | 0.5 | 0.3 | 0.002 | 0.001 | — |

TABLE 2

| Test No. | Steel Mark | Thickness (mm) | Retention Temperature (° C.) at Finishing Annealing | Maximum Change $\Delta B(T)$ in Magnetic Flux Density to $\Delta H = 50$ (A/m) | Rate of Eddy-current Loss at $W_{10/1000}$ | Remarks |
|---|---|---|---|---|---|---|
| 1 | A | 0.10 | 950 | 0.53 | 0.60 | Comparative Example |
| 2 | A | 0.05 | 1050 | 0.61 | 0.47 | Example |
| 3 | B | 0.10 | 1000 | 0.63 | 0.58 | Comparative Example |
| 4 | B | 0.07 | 1050 | 0.64 | 0.53 | Example |

TABLE 2-continued

| Test No. | Steel Mark | Thickness (mm) | Retention Temperature (° C.) at Finishing Annealing | Maximum Change ΔB(T) in Magnetic Flux Density to ΔH = 50 (A/m) | Rate of Eddy-current Loss at $W_{10/1000}$ | Remarks |
|---|---|---|---|---|---|---|
| 5 | C | 0.20 | 950 | 0.65 | 0.79 | Comparative Example |
| 6 | C | 0.10 | 1000 | 0.66 | 0.60 | Comparative Example |
| 7 | C | 0.05 | 1100 | 0.69 | 0.50 | Example |
| 8 | D | 0.15 | 1000 | 0.56 | 0.62 | Comparative Example |
| 9 | D | 0.10 | 1050 | 0.59 | 0.55 | Example |
| 10 | D | 0.05 | 1100 | 0.60 | 0.43 | Example |
| 11 | E | 0.10 | 1050 | 0.49 | 0.63 | Comparative Example |
| 12 | E | 0.05 | 1000 | 0.51 | 0.52 | Example |
| 13 | F | 0.10 | 1100 | 0.65 | 0.59 | Comparative Example |

TABLE 3

| Test No. | Steel Mark | Thickness (mm) | Time period of Siliconizing (min) | Components after Annealing (mass %) | | | Maximum Change ΔB(T) in Magnetic Flux Density to ΔH = 50 (A/m) | Rate of Eddy-current Loss at $W_{10/1000}$ | Remarks |
|---|---|---|---|---|---|---|---|---|---|
| | | | | Surface Si | Average Si | C | | | |
| 14 | A | 0.20 | 16 | 6.5 | 5.2 | 0.002 | 0.31 | 0.47 | Comparative Example |
| 15 | A | 0.20 | 12 | 5.2 | 4.3 | 0.002 | 0.55 | 0.55 | Example |
| 16 | A | 0.10 | 19 | 6.5 | 5.2 | 0.001 | 0.30 | 0.41 | Comparative Example |
| 17 | A | 0.10 | 13 | 4.6 | 3.9 | 0.001 | 0.52 | 0.46 | Example |
| 18 | A | 0.10 | 11 | 4.1 | 3.6 | 0.001 | 0.59 | 0.52 | Example |
| 19 | B | 0.20 | 14 | 6.5 | 5.5 | 0.001 | 0.38 | 0.44 | Comparative Example |
| 20 | B | 0.20 | 11 | 4.5 | 4.2 | 0.002 | 0.54 | 0.52 | Example |
| 21 | B | 0.10 | 10 | 4.4 | 4.1 | 0.002 | 0.52 | 0.46 | Example |
| 22 | C | 0.10 | 15 | 5.5 | 4.7 | 0.001 | 0.45 | 0.45 | Comparative Example |
| 23 | C | 0.10 | 10 | 4.1 | 3.8 | 0.001 | 0.52 | 0.49 | Example |
| 24 | D | 0.10 | 10 | 5.2 | 4.8 | 0.001 | 0.47 | 0.43 | Comparative Example |
| 25 | D | 0.10 | 5 | 4.5 | 4.3 | 0.001 | 0.54 | 0.50 | Example |
| 26 | E | 0.15 | 12 | 5.2 | 4.6 | 0.003 | 0.48 | 0.48 | Comparative Example |
| 27 | E | 0.15 | 8 | 4.5 | 4.1 | 0.005 | 0.50 | 0.51 | Example |
| 28 | F | 0.10 | 8 | 4.1 | 3.6 | 0.001 | 0.51 | 0.48 | Example |
| 29 | F | 0.05 | 5 | 3.7 | 3.4 | 0.001 | 0.56 | 0.44 | Example |

Figure 2:
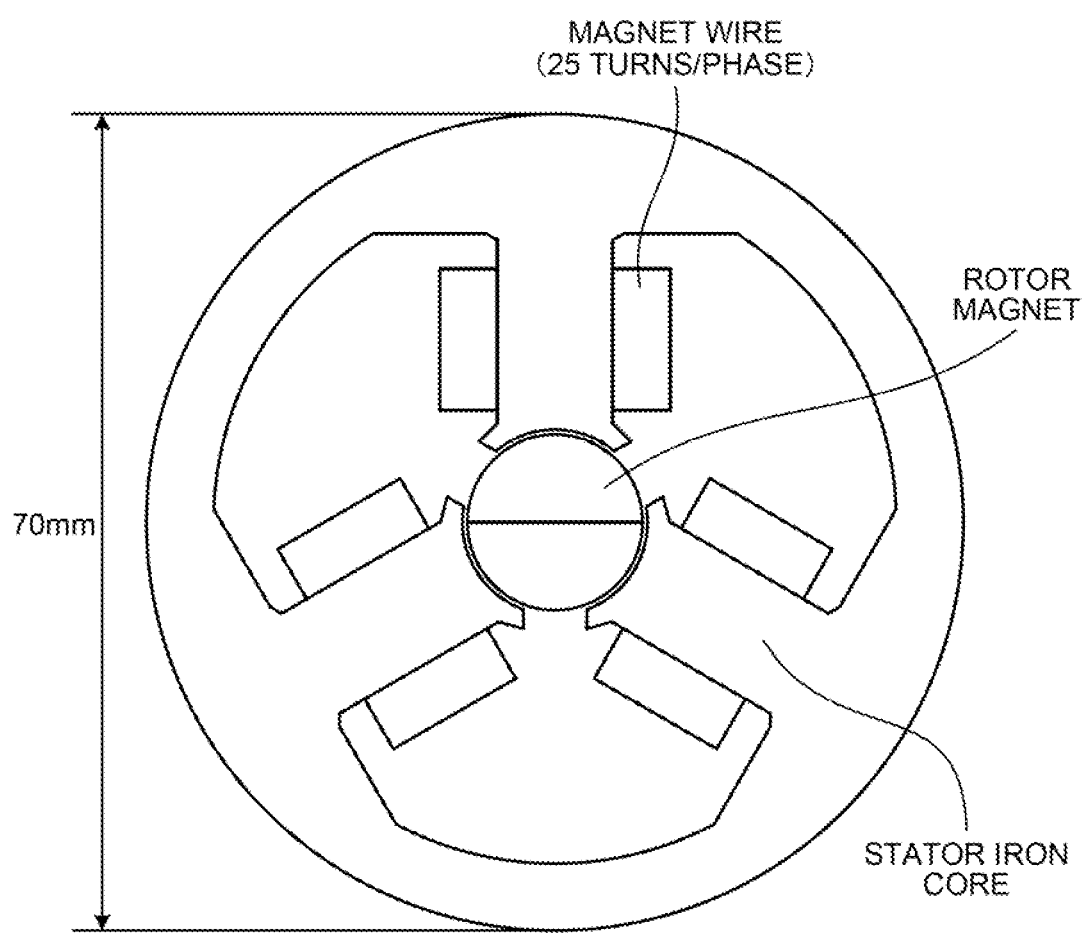
FIG. 2 is a schematic drawing that illustrates an example configuration of a two-pole three-phase brushless DC motor.

Iron cores were fabricated using the steel sheets indicated in Tables 2 and 3 to evaluate the efficiency of the motor. The evaluated motor is a two-pole 3-phase brushless DC motor (the drive voltage 25.2 V), the size of which is illustrated in FIG. 2. The iron core had a thickness of lamination of 15 mm, and the laminated steel sheets were bonded using the impregnation technique. The efficiency of the motor was evaluated based on driving conditions A (sine wave drive having current phase advance of 30 degrees at 50000 rpm–10 mNm), as conditions of drive at a rotational speed lower than the maximum rotational speed, and based on driving conditions B (sine wave drive having current phase advance of 0 degree at 85000 rpm–25 Nm), as conditions of drive at the maximum rotational speed. Table 4 demonstrates the results of evaluation. The example according to aspects of the present invention has an area having a sharp change in the magnetic flux density where a change ΔB in magnetic flux density is equal to or higher than 0.50 T to a change ΔH=50 A/m in the magnetic field and an eddy-current loss at 1000 Hz–1.0 T is equal to or less than 0.55 of the total iron loss. As demonstrated in Table 4, the example according to aspects of the present invention achieved high motor efficiency in both the driving conditions A and B with the average motor efficiency over 85%. The comparative example not satisfying the above requirements had low motor efficiency in comparison with the example according to aspects of the invention, in either or both of the driving conditions A or B with the average motor efficiency under 85%.

TABLE 4

| Test No. | Driving Conditions A Motor Efficiency (%) | Driving Conditions B Motor Efficiency (%) | Motor Average Efficiency (%) | Remarks |
|---|---|---|---|---|
| 1 | 80.3 | 86.7 | 83.5 | Comparative Example |
| 2 | 86.1 | 89.0 | 87.6 | Example |
| 3 | 82.0 | 87.5 | 84.7 | Comparative Example |
| 4 | 85.7 | 88.3 | 87.0 | Example |
| 5 | 80.4 | 84.4 | 82.4 | Comparative Example |
| 6 | 82.3 | 87.3 | 84.8 | Comparative Example |
| 7 | 86.9 | 89.0 | 87.9 | Example |
| 8 | 80.6 | 86.5 | 83.5 | Comparative Example |
| 9 | 84.6 | 87.7 | 86.2 | Example |
| 10 | 86.6 | 89.6 | 88.1 | Example |
| 11 | 74.6 | 86.0 | 80.3 | Comparative Example |

TABLE 4-continued

| Test No. | Driving Conditions A Motor Efficiency (%) | Driving Conditions B Motor Efficiency (%) | Motor Average Efficiency (%) | Remarks |
|---|---|---|---|---|
| 12 | 83.9 | 87.8 | 85.8 | Example |
| 13 | 82.2 | 87.4 | 84.8 | Comparative Example |
| 14 | 77.8 | 87.5 | 82.6 | Comparative Example |
| 15 | 84.0 | 87.5 | 85.8 | Example |
| 16 | 78.6 | 88.4 | 83.5 | Comparative Example |
| 17 | 84.9 | 88.7 | 86.8 | Example |
| 18 | 85.1 | 88.2 | 86.6 | Example |
| 19 | 78.7 | 88.3 | 83.5 | Comparative Example |
| 20 | 84.3 | 87.9 | 86.1 | Example |
| 21 | 84.9 | 88.7 | 86.8 | Example |
| 22 | 79.3 | 88.5 | 83.9 | Comparative Example |
| 23 | 84.5 | 88.3 | 86.4 | Example |
| 24 | 79.8 | 88.9 | 84.4 | Comparative Example |
| 25 | 84.6 | 88.2 | 86.4 | Example |
| 26 | 79.2 | 88.2 | 83.7 | Comparative Example |
| 27 | 83.9 | 87.9 | 85.9 | Example |
| 28 | 84.5 | 88.4 | 86.4 | Example |
| 29 | 85.8 | 89.2 | 87.5 | Example |

INDUSTRIAL APPLICABILITY

According to aspects of the present invention, it is possible to provide a motor capable of achieving higher efficiency, downsizing, and higher speed by reducing the iron loss during drive at a rotational speed lower than the maximum rotational speed.

The invention claimed is:

1. A motor comprising a steel sheet used as a core material of the motor, wherein
the steel sheet includes a composition including: by mass %, 0.010% or less of C; 2.0% to 7.0% of Si; 2.0% or less of Al; 0.05% to 1.0% of Mn; 0.005% or less of S; 0.005% or less of N; and balance Fe and inevitable impurities;
the steel sheet includes a magnetic flux density changing area where a change $\Delta B$ in magnetic flux density to a change $\Delta H=50$ A/m in a magnetic field, is equal to or higher than 0.50 T;
a thickness of the steel sheet is 0.05 mm to 0.20 mm; and
an eddy-current loss of the steel sheet, at 1000 Hz–1.0 T, is equal to or less than 0.55 of a total iron loss, wherein
a difference between a concentration of Si at a surface of the steel sheet and a concentration of Si at a center portion of the steel sheet is 0.5% to 4.0%, and
a saturation magnetic flux density Bs of the steel sheet is equal to or greater than 2.0 T.

2. The motor according to claim 1, wherein the steel sheet further includes: by mass %, at least one element selected from 0.01% to 0.1% of P; 0.001% to 0.1% of Sn; 0.001% to 0.1% of Sb; and 0.001% to 0.01% of Mo.

3. The motor according to claim 2, wherein the magnetic flux density changing area is present in an area including a magnetic flux density equal to or higher than 1 T.

4. The motor according to claim 1, wherein the magnetic flux density changing area is present in an area including a magnetic flux density equal to or higher than 1 T.

* * * * *